R. VARLEY.
APPARATUS FOR MAKING COILS.
APPLICATION FILED OCT. 14, 1911.
1,047,720.
Patented Dec. 17, 1912.
3 SHEETS—SHEET 3.
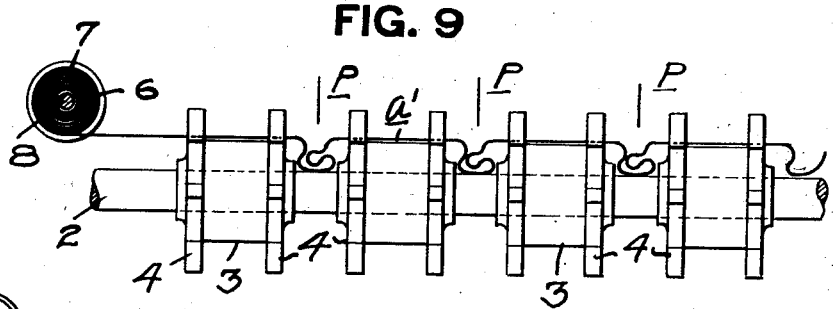
FIG. 9
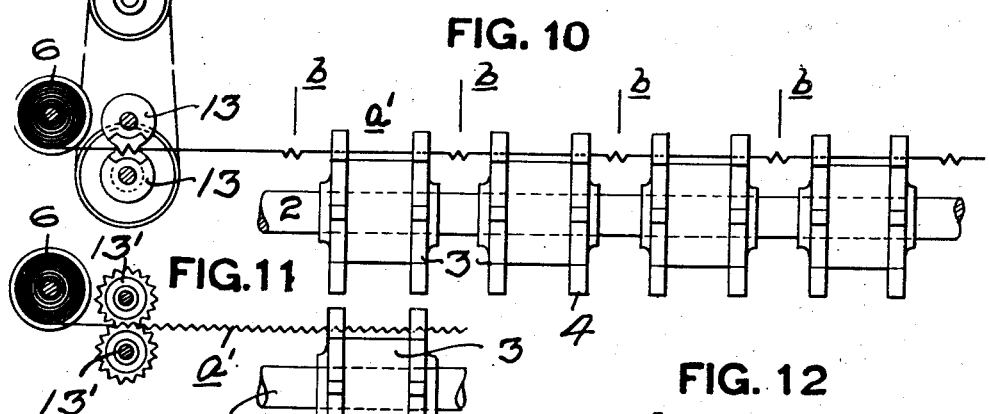
FIG. 10
FIG. 11
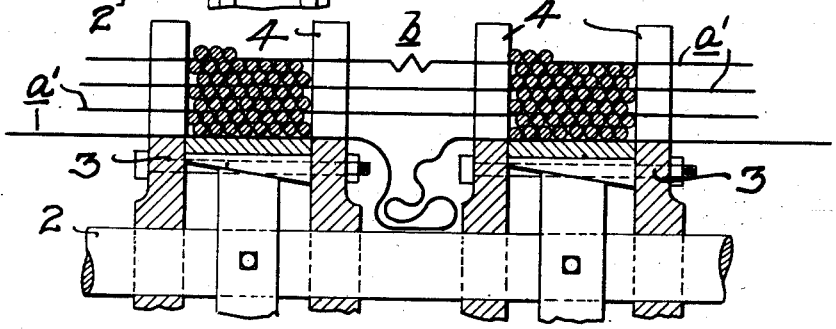
FIG. 12
FIG. 15
FIG. 16
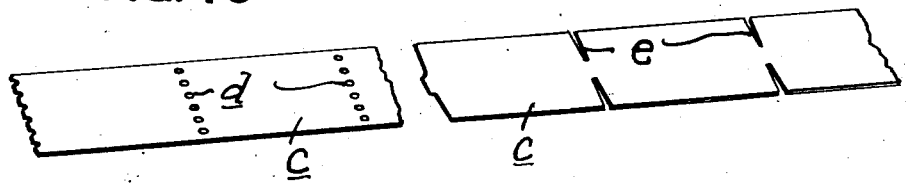
WITNESSES.
INVENTOR.

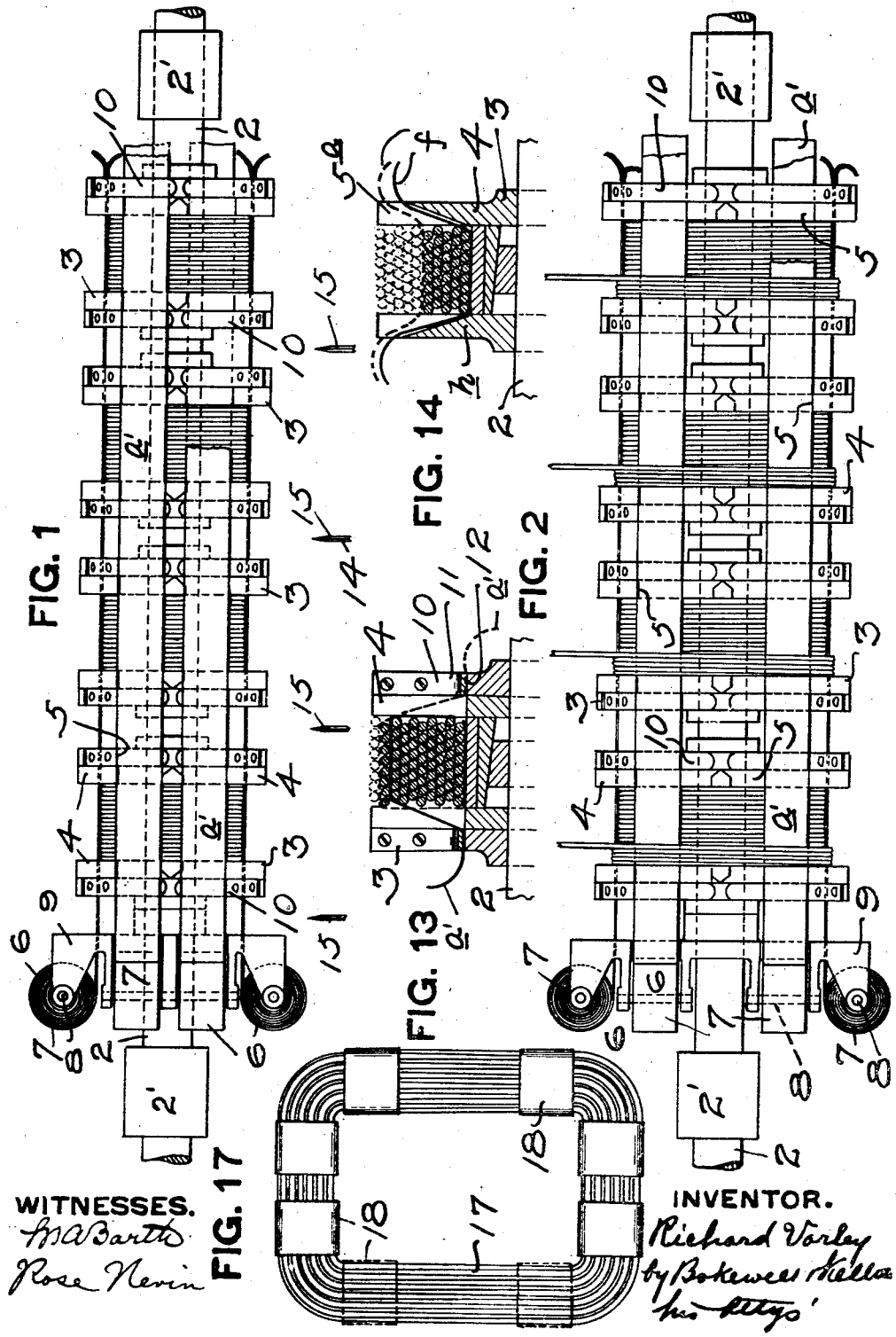
R. VARLEY.
APPARATUS FOR MAKING COILS.
APPLICATION FILED OCT. 14, 1911.
1,047,720.
Patented Dec. 17, 1912.
3 SHEETS—SHEET 1.

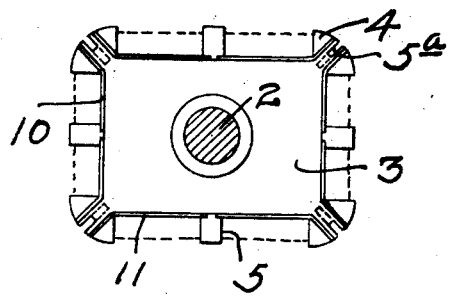
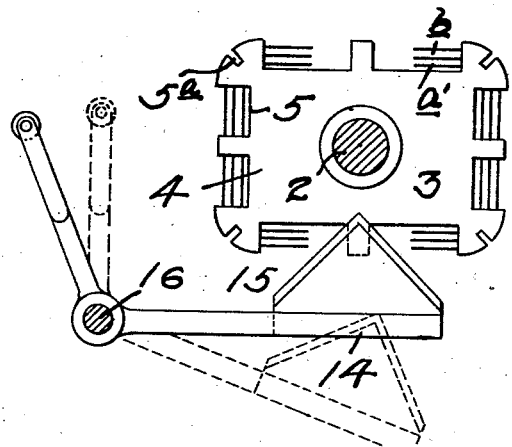
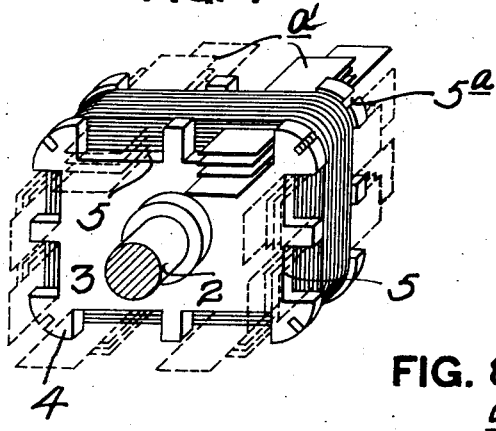
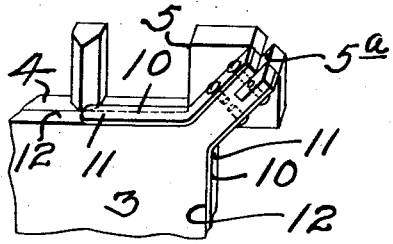
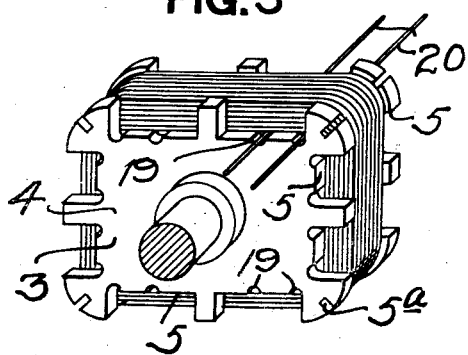
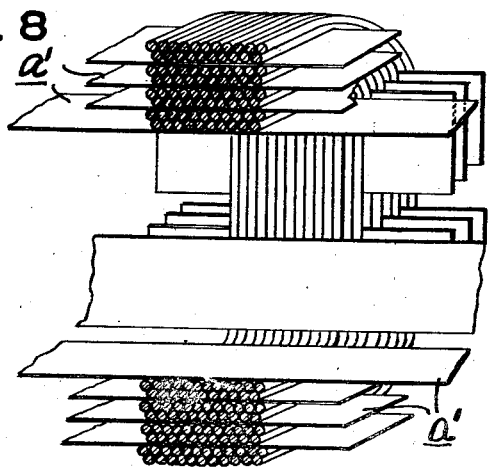

UNITED STATES PATENT OFFICE.

RICHARD VARLEY, OF ENGLEWOOD, NEW JERSEY, ASSIGNOR TO VARLEY DUPLEX MAGNET COMPANY, OF JERSEY CITY, NEW JERSEY, A CORPORATION OF NEW JERSEY.

APPARATUS FOR MAKING COILS.

1,047,720.      Specification of Letters Patent.     Patented Dec. 17, 1912.

Application filed October 14, 1911. Serial No. 654,755.

*To all whom it may concern:*

Be it known that I, RICHARD VARLEY, a citizen of the United States of America, and residing at Englewood, in the county of Bergen and State of New Jersey, have invented new and useful Apparatus for Making Coils, of which the following is a full, clear, and exact description, reference being had to the accompanying drawings, which form part of this specification.

The object of my invention is to provide new, simple and efficient apparatus for making electric coils.

In such an apparatus I aim to provide means whereby a coil may be quickly and accurately wound.

I also aim to provide means whereby a plurality of coils may be contemporaneously formed.

In making the coil provision is made for the presentation to and incorporation in the coil, of strips of binding element in such manner as to firmly tie or bind against displacement the turns of the winding.

I will now describe my invention so that others skilled in the art to which it appertains may understand and construct the same. While reference is had, in such description, to the attached drawing, I do not desire to limit myself to such apparatus as it will be premised many changes may be made therein without departing from the spirit thereof. For instance, the coil formers of such apparatus may be shaped for the production of circular or other shaped coils other than the angular shape shown.

Figure 1 is a side elevation of apparatus illustrating my invention and showing provision for the making of a plurality of coils, preferably in contemporaneous manner; Fig. 2 is a top plan view of the same; Fig. 3 is an end view of one of the coil mandrels or formers and showing coil winding thereon; Fig. 4 is a perspective view of a coil former, showing a coil thereon and having, partly in full lines and partly in dotted lines, indicated strips of binding element incorporated in the coil; Fig. 5 is a similar view showing a modified construction of coil former for adaptation thereof to reception of narrow binding elements, such as strands of wire; Fig. 6 is an end view of a coil former, and indicating, largely in diagram, severing of connecting strips of binding element lying intermediate adjoining coil formers; Fig. 7 is a fragmentary perspective view of a corner portion of the coil former and showing means for terminally clamping strips of binding tape against displacement; Fig. 8 is a perspective view of a coil made by my improved apparatus and showing the condition thereof preparatory to its removal from a coil former; Fig. 9 is a diagrammatic view showing manner of supplying a plurality of coil formers, with binding tape, and preferably from a common source of supply; Fig. 10 is a similar view showing manner of presenting binding tape to the coils in the progress of making, this view illustrating, primarily, the feeding of tape adapted to form binding element lying within the very body of the coil as will be hereinafter more fully described; Fig. 11 is a similar fragmentary view showing means for corrugating the tape prior to its application to the coil; Fig. 12 is an enlarged sectional view through a plurality of coil formers, and showing modified form of means for corrugating the tape; Fig. 13 is a cross-sectional view of a portion of a coil former and indicating, partly in diagram, manner of anchoring portions of binding tape, within the coil; Fig. 14 is a similar view showing manner of binding different portions of the coil with separate strips of binding element, and as applied to binding of the corners of angular coils, the coil former showing construction adaptable for such purpose; Figs. 15 and 16 are perspective views of modified forms of binding tape used in connection with my apparatus and Fig. 17 is a plan view of an angular coil made by my apparatus.

In carrying out my invention I preferably provide for the contemporaneous formation of a plurality of coils, and in describing the mechanism so provided and shown in the accompanying drawings, I illustrate in connection therewith a method of making coils described in my co-pending application Serial No. 654,752. I do not, however, desire to limit my apparatus to the carrying out of any particular method. The method herein disclosed shows the feeding of binding tape or strip to coil mandrels and coils either preparatory to winding or during the winding or both, which binding element is incorporated in and becomes part of the coil. However, certain portions of a strip may be used as a temporary or provisional binder, such as a strip superficially wrapped about the coil to enable it to keep its shape in certain respects and to assist portions of other tape carried by the coil, as will appear hereinafter. The application of the tape, if to be a superficial binder, may first be to the mandrels or formers after which the winding of the coil may proceed, and during the winding portions of binding strip are supplied to the coil at intervals in the development of such winding. The binding tape may comprise strips of paper, cambric, or very thin fiber-board, and is preferably so incorporated as to allow of end or terminal extension beyond the body of the coil, which extension may be incorporated in layers of the winding or may be bound to superficial turns of the coil at the ends thereof so as to reinforce such turns and the layers as a whole against displacement. Binding of the ends of the tape against the ends of the coil may be effected by wrapping the coil about in the plane of the extension by certain portions of the same tape or by the employment of a superficial tape such as that first presented to the coiling mandrel. Or, in lieu of the tape applied to the outer faces of the coil, I may use a metallic binder such as strands of small gage wire.

The numeral 2 represents a rotatory shaft or spindle which may form the main operative element of a coil machine. I do not disclose in the drawings the frame-work or housing or like construction for the reason that these may be supplied by the mechanic and may comprise the suitable mountings of coiling machines such as the "Varley coil machines." However, I indicate by the numeral 2' bearings in which the spindle 2 may be journaled. Carried by the spindle 2 are coil formers or mandrels 3, which may be of the usual construction in so far as concerns their separability for the removal of completed coils. These formers are provided with end disks or members 4, the spacing of which from one another determines the length of the coil to be wound upon the former. In the disks 4 I form recesses 5 which preferably extend from the periphery of the disk in each case to the body of the former, or substantially to the body, as shown in Figs. 12, 13 and 14.

With a plurality of coil formers mounted in a common manner on the spindle 2 the recesses 5 of the different formers may lie in alinement or in register with one another as shown in Figs. 1 and 2, so that tape may be fed from a common source of supply 6 in its presentation to the plurality of coils or mandrels for the reason that the said recesses 5 enable binding tapes $a'$ to be so presented and applied to the coil as to act as guides thereof and thereby bring about desirable superpositioning of the tapes when a plurality are employed at the same points in the development of the coil and also proper disposition of tapes at intervals along the winding or body of the coil. But a further purpose and important feature of my invention is that it enables the application of tapes to the mandrels or coils in such manner as to allow of extensions of tape from the ends of the coils so as to overcome abortive binding action due to the drawing in of the terminal portions of binding tape, arising from the corrugating action set up by the application of the turns of wire upon the tapes as such turns go into position in alternate or staggered manner with respect to the underlying turns.

The source of supply 6 of binding tape may be in the form of suitable rolls 7 which may be carried by suitable shafts or journals 8. In Figs. 1 and 2 I show these rolls 7 as being mounted in a suitable support 9, carried so as to rotate with the mandrels 3. This insures proper positioning of the several rolls with respect to the alining recesses 5 of the formers or mandrels. If the source of supply 6 of tape is not so associated with the coil formers 3 as to rotate in unison therewith, that is, if the source of supply is stationed at a fixed or practically fixed point from the rotatory mandrels, it would be necessary, of course, to sever the supply of tape requisite to the binding contemplated. If the supply is made to rotate with the coil formers or mandrels, as indicated in Figs. 1 and 2, the necessity of severing the tape does not arise until further application thereof to other portions of the winding. By mounting the support 9 close to its respective former 3 such intimate association serves to prevent displacement of the tape from the recesses 5 at that end of the spindle 2. The opposite end of the tape is held by clamping means 10 which may comprise a suitable spring clip under which the paper is inserted as it is supplied to the mandrel. This clip is shown in a very clear manner in Fig. 7 and as comprising the resilient leaf 11 which coacts with a face 12 of the former 3 to clamp the tape.

In Fig. 10 I show corrugating elements 13 between which the tape $a'$ may be passed in its travel from the source of supply 6 to the coil formers 3. This corrugating means 13 is of such character as to corrugate the tape at intervals so disposed as to be capable of assuming positions intermediate the different formers 3 upon proper adjustment of such tape. These corrugations are indicated at $b$, and the object thereof is to provide for such presentation of tape to coils in which the gage of winding is of large size as to set up corrugating action on the tape, with resultant placing of injurious strains on such tape, as the turns of wire assume staggered relationship with the different layers. By providing the corrugations $b$ the tape is thereby rendered capable of movement without straining thereof. This is an important feature of my apparatus for, unless provision is made to allow of this corrugating action by the wire to take place without injurious strains on the tape, fracture of the tape might occur at points within the coil and thereby depreciably affect the binding action of such tapes. As clearly shown in Fig. 12 the tape may freely move by reason of the corrugation b which constitutes a reservation intermediate the coils.

In Fig. 11 I show the corrugating means 13′ as adapted for continuous corrugation of the tape as it passes from the source of supply 6. By continuously corrugating the tape strains are obviated by reason of the fact that the corrugations adjust themselves to the contour of the wire as it is applied. However, in lieu of corrugating the tape I may employ tape capable of separating very readily at points intermediate the coils. Such a tape c is shown in Figs. 15 and 16 and as having corrugations d or slots e respectively so spaced along the tape as to be capable of assuming positions between the coils; the application of the winding and resultant take-up of the tape causes separation at the points of perforation or other incisions.

In Figs. 1 and 6 the numeral 14 indicates severing apparatus which may be presented to the mandrels for the purpose of cutting the tapes between the several mandrels. This apparatus is employed in cases where the tape is not severed under the corrugating action of the winding. As shown in Fig. 6, it may comprise a suitable knife 15 mounted as by means of a pivot 16 so as to be capable of ready presentation and retraction from the tapes b as the coiling mandrels are rotated. The mandrels 3 may each be provided with clamping means 10 disposed at each side thereof to permit of individual holding of tape in its application to the coil.

As shown in Fig. 13, the tape may be passed back and forth in such a manner as to be terminally held by the clamps while layers or turns of wire are applied to anchor the same within the coil. However, the clamping means is not limited to such manipulation of the tape but may be used in any desirable manner.

In Fig. 14 I show in cross section the corner of the coil-former on a line passing through corner recesses 5ª which may receive winding tape f for the binding of the corners of the angular coil. These recesses are shown as communicating with the winding zone of the former on an angle through the disk 4 for the purpose of providing a thickness of metal as at h at the corner of the mandrel which is weakened by the close positions of the recesses 5 in the particular mandrels shown. The object in providing for the binding of the corner of the coil is to take care of the tendency of the corner to spread or fan out upon its removal from between the disk 4 of the mandrel. The manner of applying the binding element f may be varied as desired as this method does not form part of the present invention.

Where binding tape is first fed to the mandrels and so as to lie in recesses 5 or 5ª and the winding of the coil proceeded with after which the coil may be bound with such binding tape, I preferably so space the mandrels as to conserve space and so apply the tape as to provide for a gathering or accumulation thereof at points p, or points intermediate the mandrels, as shown in Fig. 9, so that sufficient length of tape is provided for the wrapping of the coil of each mandrel.

In Fig. 17 I show the coil 17 as being superficially wrapped by means of binding tape, as indicated at 18. However, instead of wrapping the coil with tape, the mandrel 3 may be provided with suitable recesses 19 for the accommodation of strands of small gage wire which may be employed in lieu of the outer tape. This construction is shown in Fig. 5 wherein the strands of wire are indicated by the numeral 20.

The particular coil former disclosed herein forms subject matter of my co-pending application Serial No. 654,753, and I do not, therefore, claim the same in this application.

It will be apparent that many changes may be made in my apparatus as above described, which would not be departures from my invention. While I have spoken of the apparatus as adapted to the formation of a plurality of coils contemporaneously, I may wind the coils in a single manner, for,

What I claim and desire to secure by Letters Patent is:

1. In apparatus for making coils, a shaft, a coil former mounted thereon, a source of supply of binding tape, and means for guiding the tape in presentation thereof to the former on a line parallel with the axis of the shaft.

2. In apparatus for making coils, a shaft, a coil former mounted on the shaft, a source of supply of binding tape, means for guiding binding tape in its presentation in the making of the coil, and means for holding the ends of the tape against displacement.

3. In apparatus for making coils, a shaft, a coil former carried thereby, a source of supply of binding tape, means whereby presentation of binding tape to the coil may be effected in a plane substantially parallel with the winding face of the former, and means for holding the tape against displacement.

4. In apparatus for making coils, a shaft, a coil former mounted thereon, a source of supply of binding tape, and means enabling the presentation of strips of binding element to the coil, at a plurality of points and in a plane substantially parallel with the axis of the shaft.

5. In apparatus for making coils, a shaft, a coil former mounted thereon, and means for enabling presentation of a plurality of strips of binding element to the coil, in a common plane substantially coincident with layers of winding and in a line parallel with the axis of the shaft.

6. In apparatus for making coils, a shaft, a coil former thereon, a source of binding tape, and means for guiding the tape in presentation thereof at a plurality of points in a common plane to the coils and in a line parallel with the axis of the shaft, and means for holding the tape against displacement.

7. In apparatus for making coils, a coil former mounted upon a rotatory shaft, a source of supply of binding tape for feeding to the formers and capable of rotatory travel with the shaft, and means for guiding the tape in presentation thereof to the former, on a line parallel with the axis of the shaft.

In testimony whereof, I have hereunto set my hand.

RICHARD VARLEY.

Witnesses:
M. A. BARTH,
M. A. KELLER.